Aug. 3, 1926.
F. LUNDBERG
ANTISKID MAT
Filed Oct. 24, 1925
1,594,623
2 Sheets-Sheet 1
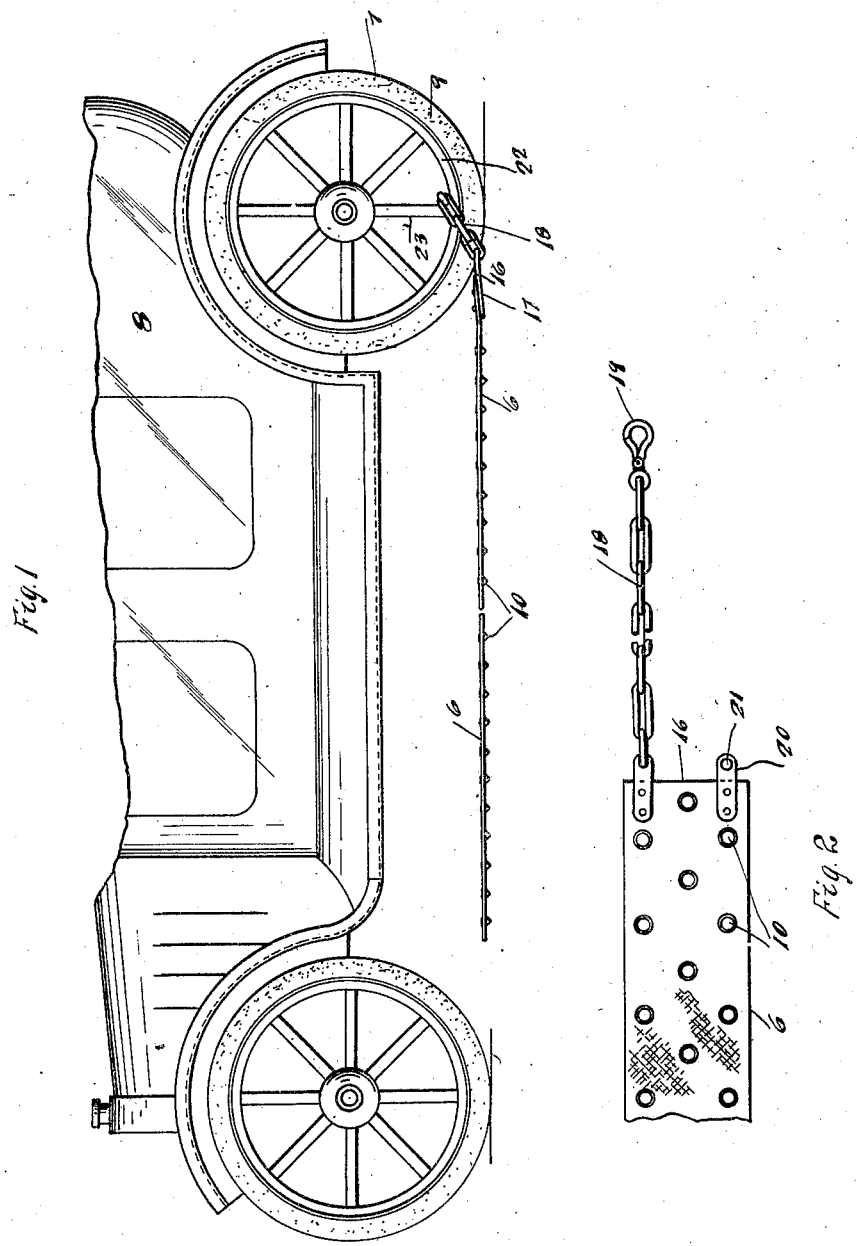
Witnesses:
Inventor:
Frederick Lundberg
By Joshua R. H. Roth
His Attorney Aug. 3, 1926.

F. LUNDBERG 1,594,623

ANTISKID MAT

Filed Oct. 24, 1925

Witnesses:

Inventor:
Frederick Lundberg
by Joshua R. H. Potts
His Attorney

Patented Aug. 3, 1926.

1,594,623

UNITED STATES PATENT OFFICE.

FREDERICK LUNDBERG, OF CHICAGO, ILLINOIS.

ANTISKID MAT.

Application filed October 24, 1925. Serial No. 64,589.

My invention relates to anti-skid mats for use in connection with the wheels of motor vehicles to provide traction over difficult and impassable spots in the roadway, and my invention has for its main object the provision of an improved device of this character which will embody certain desired features of simplicity, efficiency and convenience, and which will be economical in manufacture and durable in use.

Other objects will appear hereinafter.

The invention consists in the combinations and arrangements of parts hereinafter described and claimed.

The invention will be best understood by reference to the accompanying drawings forming a part of this specification, and in which:—

Fig. 1 is a side elevational view showing my improved mat associated with a motor vehicle;

Fig. 2 is a fragmentary plan view, showing the means for securing the end of the mat to the automobile wheel;

Figure 3:
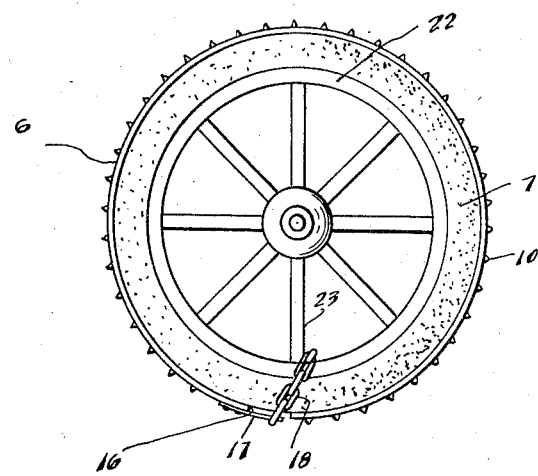
Fig. 3 is a side elevation showing the mat as it appears when encircling the circumference of the wheel.
Figure 4:
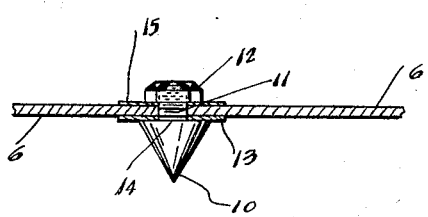
Fig. 4 is a sectional detail, showing the type of traction studs associated with a mat.
Figure 5:
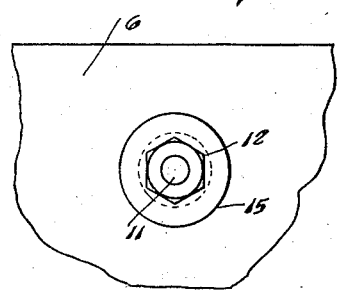
Fig. 5 is a fragmentary plan view showing the top end of the traction stud.

The preferred embodiment of my invention, as illustrated in the accompanying drawings, comprises a mat strip 6 which is placed upon the roadway or street so as to extend over the icy or slippery spot directly in the path of the traction wheel 7 of the motor vehicle 8. The mat strip may be made of any suitable pliable material such as leather, canvas-belting or the like, which is adapted to conform to the circumference of the tire 9. If desired, the mat strip may also be made of metal strips suitably connected so as to yield sufficiently to conform to the circumferential contour of the tire.

Preferably and as shown, the mat strip is studded with conically headed members 10 adapted to penetrate the ice or snow and to exert a traction effort on the roadway. These conically headed members are made with shanks 11 which are taken transversely through the mat and which are screw-threaded for the reception of the securing nuts 12. Suitable washers as 13 are interposed between the flat bases 14 of the conical heads and the mat 6; while other suitable washers 15 are placed between the mat and the nuts.

As clearly illustrated in Fig. 1, the anti-skid mat is placed in the path of the wheel to be assisted, with one end 16 of the mat lying in proximity to the tread of the tire 9. Secured to this extremity of the mat is the means whereby detachably to secure the end of the mat to the wheel, in order that the mat strip will be drawn about the tread of the wheel so as to assume the position illustrated in Fig. 3 when the wheel is revolved. Preferably and as shown, this means comprises a link 17 which is riveted or otherwise secured to the mat and to which is connected a chain 18 carrying a snap hook 19. The mat is also equipped with another link 20 provided with an eye 21. The mat having been placed in position for the wheel to turn thereupon, as illustrated in Fig. 1, the chain 18 is taken transversely across the wheel felly 22 behind a spoke 23. By this arrangement, the mat may be quickly attached to the wheel when an icy or slippery place in the road is to be traversed, and may as quickly be removed from the wheel when the mat is no longer needed. As illustrated in Fig. 3, the mat strip is somewhat less in length than the circumferential dimension of the tire 9 so that the extremities of the mat will not overlap.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:—

1. An anti-skid device comprising an imperforate mat strip for placement on the roadway to receive the wheel tire thereon and consisting of pliable material capable of curving both circumferentially and transversely about the tire tread; and a series of shanks taken through the strip, headed at the underside thereof and furnished with nuts at the top side thereof.

2. An anti-skid device comprising an imperforate mat strip for placement on the roadway to receive the wheel tire thereon and consisting of pliable material capable of curving both circumferentially and transversely about the tire tread; a series of shanks taken through said strip, headed at the underside thereof and furnished with nuts at the top side thereof; and wearing members interposed between the heads and ends of the shanks and said strip, substantially as described.

3. An anti-skid device comprising an imperforate mat strip of flexible material capable of curving both circumferentially and transversely about a wheel tire; a series of shanks taken through the strip; heads on said shanks at the underside of the strip; nuts on the said shanks at the top side of the strip; a pair of links secured at one end of the strip; and a chain attached to one link and carrying means adapted to be interlocked with the other of the links, substantially as described.

In testimony whereof I have signed my name to this specification.

FREDERICK LUNDBERG.